United States Patent
Saito et al.

[11] Patent Number: 5,534,096
[45] Date of Patent: Jul. 9, 1996

[54] CATHODE-RAY TUBE APPARATUS AND METHOD OF PRODUCING THE SAME

[75] Inventors: Tsunenari Saito, Tokyo; Shiro Kenmotsu; Takuji Inoue, both of Saitama, all of Japan

[73] Assignee: Sony Corporation, Tokyo, Japan

[21] Appl. No.: 276,435

[22] Filed: Jul. 15, 1994

[30] Foreign Application Priority Data

Jul. 21, 1993 [JP] Japan .................................. 5-201754

[51] Int. Cl.$^6$ .................................................. B32B 17/06
[52] U.S. Cl. ...................... 156/212; 156/267; 156/275.5; 156/344
[58] Field of Search ............................... 427/64, 68, 508, 427/385.5, 165; 156/212, 213, 275.5, 344, 267

[56] References Cited

U.S. PATENT DOCUMENTS

| | | | |
|---|---|---|---|
| 3,329,545 | 7/1967 | Hamilton | 156/213 |
| 4,739,412 | 4/1988 | Lee | 156/275.5 |
| 4,943,862 | 7/1990 | Uesaka et al. | 358/245 |
| 5,417,791 | 5/1995 | Beeteson | 156/295 |
| 5,439,406 | 8/1995 | Fuwa | 156/344 |

FOREIGN PATENT DOCUMENTS 0255958  2/1988  European Pat. Off. .

OTHER PUBLICATIONS

Patent Abstracts of Japan, vol. 15, No. 438, Nov. 8, 1991.
Patent Abstracts of Japan, vol. 8, No. 209, Sep. 1984;.
Funkschau, vol. 35, No. 17, 1963 (no mo.).

*Primary Examiner*—Janyce Bell
*Attorney, Agent, or Firm*—Ronald P. Kananen

[57] ABSTRACT

A cathode-ray tube apparatus (CRT) including a panel glass which has been subjected to no external polishing, and an ultraviolet-curing resin layer provided on the panel glass and having a refractive index which differs from that of the panel glass by not more than 0.8%. The CRT further includes a light-transmitting film provided on the resin layer. Also disclosed is a production method which enables a reduction in the weight of a CRT and an improvement in the explosion-proof performance, which have been demanded with the realization of large-sized CRTs and flat-panel CRTs, and which also makes it possible to produce such CRTs by a simplified process and at a reduced cost.

5 Claims, 5 Drawing Sheets

CATHODE-RAY TUBE APPARATUS AND METHOD OF PRODUCING THE SAME

BACKGROUND OF THE INVENTION

1. Field of the Invention

The present invention relates to a cathode-ray tube apparatus (hereinafter referred to as "CRT") having a film stacked on the surface of a panel glass, and also relates to a method of producing the same.

2. Description of the Related Art

Recently, with the progress of computer simulation technology, it has become possible to make a practical strength analysis for CRTs, and large-sized CRTs and flat-panel CRTs, which are substantially equal to conventional CRTs in the bulb strength as being vacuum glass bulbs, have been realized by design according to the results of the strength analysis.

Such a large-sized or flat-panel CRT suffers, however, from some problems as stated below: To ensure the required bulb strength, the panel glass must be made thick in comparison to the conventional CRTs, and hence the overall weight of the CRT unavoidably increases. If the wall thickness of the panel glass is merely reduced to minimize the overall weight of the CRT, the bulb strength lowers, and the explosion-proof performance degrades.

Therefore, the existing CRTs employ a thin-walled panel glass and, at the same time, adopt an explosion-proof technique, e.g., banding, PPG laminating, resin bonding, and so forth.

Among the above-mentioned explosion-proof techniques, the banding method uses a panel glass which has been subjected to rough S/E polishing after pressing, followed by external polishing, which includes roughing, semi-finishing and finishing, and S/E polishing, thereby smoothing the surface thereof, and a band is fastened around the panel glass. The banding method includes the shrunk band method, the Kim chord method, and the T-band method, which are classified according to the manner in which the panel glass is banded. Among these methods, the shrunk band method is the mainstream of explosion-proof technique because it is suitable for mass-production. The PPG laminating method uses a panel glass which has been subjected to roughing and semi-finishing as external polishing but not subjected to finishing as external polishing, and it includes the steps of placing a spacer on the panel glass, placing a glass plate of 2 mm in thickness on the spacer, carrying out taping, injecting a thermosetting adhesive, and setting the adhesive by heating. The resin bonding method uses a panel glass which has been subjected to roughing, semi-finishing and finishing as external polishing, followed by S/E polishing, thereby smoothing the surface thereof, and a resin adhesive is coated on the panel glass to form a resin layer.

It should be noted that the conventional CRT manufacturing methods, including the above-described banding method, generally use a panel glass which has been subjected to rough S/E polishing after pressing, followed by external polishing, which includes roughing, semi-finishing and finishing, and S/E polishing. Such polishing is carried out so that irregularities of 5 um to 300 um in depth, which are produced on the outer surface of the panel glass as clamp marks of GOB or shrinkage marks during the pressing process, are reduced to 1 um or less, generally on the order of 0.1 um, to form a mirror surface, thereby preventing the fluorescent screen from undesirably glaring when the phosphors emit light.

As has been described above, various explosion-proof techniques have heretofore been carried out on large-sized or flat-panel CRTs in order to enable a reduction in the weight of the panel glasses thereof. To promote the achievement of a reduction in the overall weight of such CRTs, there has been a demand for a novel explosion-proof technique whereby the bulb strength is further enhanced.

The conventional CRTs use a panel glass which has been subjected to rough S/E polishing, followed by external polishing and S/E polishing, to prevent undesired glaring of the fluorescent screen. However, such polishing lowers the mechanical strength of the panel glass, and the polishing cost reaches 30% to 35% of the panel cost. Therefore, it has been demanded to make it possible to minimize polishing and increase the anti-explosion strength.

Among the conventional explosion-proof techniques, the PPG laminating method involves the problem that the taping and other processes are complicated, and a defective product is likely to occur because of bubbles which are generated during setting of the thermosetting adhesive by heating, although the finish polishing of the panel glass is omitted in this method. Further, it is difficult to prepare a thermosetting adhesive used in this method so that it has desired characteristics. As a result, undesired glaring of the fluorescent screen may occur. That is, the thermosetting adhesive used in the PPG laminating method is required to have a minimal change in volume before and after it becomes set upon heating because it is used to bond the panel glass and the glass plate stacked thereon. In addition, since the surface of the panel glass has been subjected to no finish polishing and is not a mirror surface, it is preferable that the refractive index of the thermosetting adhesive should be the same as that of the panel glass. However, if the thermosetting adhesive is prepared so that no substantial change in volume occurs, it is difficult to adjust the refractive index of the thermosetting adhesive so that the difference between the refractive indices of the thermosetting adhesive and the panel glass is not more than 1%. Consequently, undesired glaring of the fluorescent screen cannot effectively be prevented.

OBJECT AND SUMMARY OF THE INVENTION

It is an object of the present invention to enable a reduction in the weight of a CRT and an improvement in the explosion-proof performance, which have been demanded with the realization of large-sized CRTs and flat-panel CRTs, and to allow such CRTs to be produced by a simplified process and at a reduced cost.

The present inventors have found that when a light-transmitting film is stacked on the panel glass in place of the glass plate, the requirement for an adhesive used to bond together the panel glass and the light-transmitting film that the adhesive must not have a substantial change in volume before and after it becomes set on heating, as in the PPG laminating method, is eased, and it is therefore possible to readily prepare an adhesive having the same refractive index as that of the panel glass, and that the use of an adhesive having the same refractive index as that of the panel glass prevents undesired glaring even when a panel glass which has been subjected to no external polishing is used, and further that an ultraviolet-curing resin is particularly suitable for use as such an adhesive because it has a high curing speed and excellent workability. The present invention has been accomplished on the basis of the above-described finding.

That is, the present invention provides a cathode-ray tube apparatus (CRT) including a panel glass which has been subjected to no external polishing, and an ultraviolet-curing resin layer provided on the panel glass and having a refractive index which differs from that of the panel glass by not more than 0.8%. The CRT further includes a light-transmitting film provided on the resin layer.

In addition, the present invention provides a method of producing the above-described CRT, wherein the panel glass surface treating process includes the steps of: coating a surface of a panel glass which has been subjected to no external polishing with an ultraviolet-curing resin composition which gives a cured material having a refractive index which differs from the refractive index of the panel glass by not more than 0.8%; providing a light-transmitting film on the ultraviolet-curing resin composition; and curing the ultraviolet-curing resin composition by irradiation with ultraviolet radiation, thereby integrating the panel glass, the ultraviolet-curing resin composition and the light-transmitting film into one unit.

The CRT of the present invention uses a panel glass which has been subjected to no external polishing. Therefore, the panel glass itself has irregularities of about 30 um in depth on the surface thereof. However, an ultraviolet-curing resin layer having a refractive index which differs from the refractive index of the panel glass by not more than 0.8% is stacked on the panel glass, and a light-transmitting film is stacked on the ultraviolet-curing resin layer. Therefore, from the viewpoint of the light transmission properties, a substance which is substantially equal in refractive index to the panel glass is uniformly provided on the lower surface of the smooth light-transmitting film. Accordingly, the CRT is free from undesired glaring as occurs in a case where a panel glass which has been subjected to no external polishing is used in the conventional CRTs.

Further, the use of a panel glass which has been subjected to no external polishing invites no lowering in the mechanical strength of the panel glass, which would otherwise be caused by external polishing, and hence enables an improvement in the explosion-proof performance. In addition, the polishing cost can be reduced, and it becomes possible to produce a CRT which is excellent in explosion-proof performance at a reduced cost.

Further, unlike the PPG laminating method, in which a glass plate is stacked on the panel glass, the method of the present invention uses a light-transmitting film which is laminated on the panel glass. Therefore, it becomes possible to reduce the overall weight of the CRT, and it is also possible to prevent scattering of the glass and injury which might otherwise be done to the user. In addition, since it becomes unnecessary to carry out complicated processes, e.g., placing a glass plate, taping, and so forth, the process of producing a CRT endowed with explosion-proof properties can be simplified to a considerable extent in comparison to the PPG laminating method.

DETAILED DESCRIPTION OF THE PREFERRED EMBODIMENTS

Embodiments of the present invention will be described below in detail with reference to the accompanying drawings.

Figure 1:
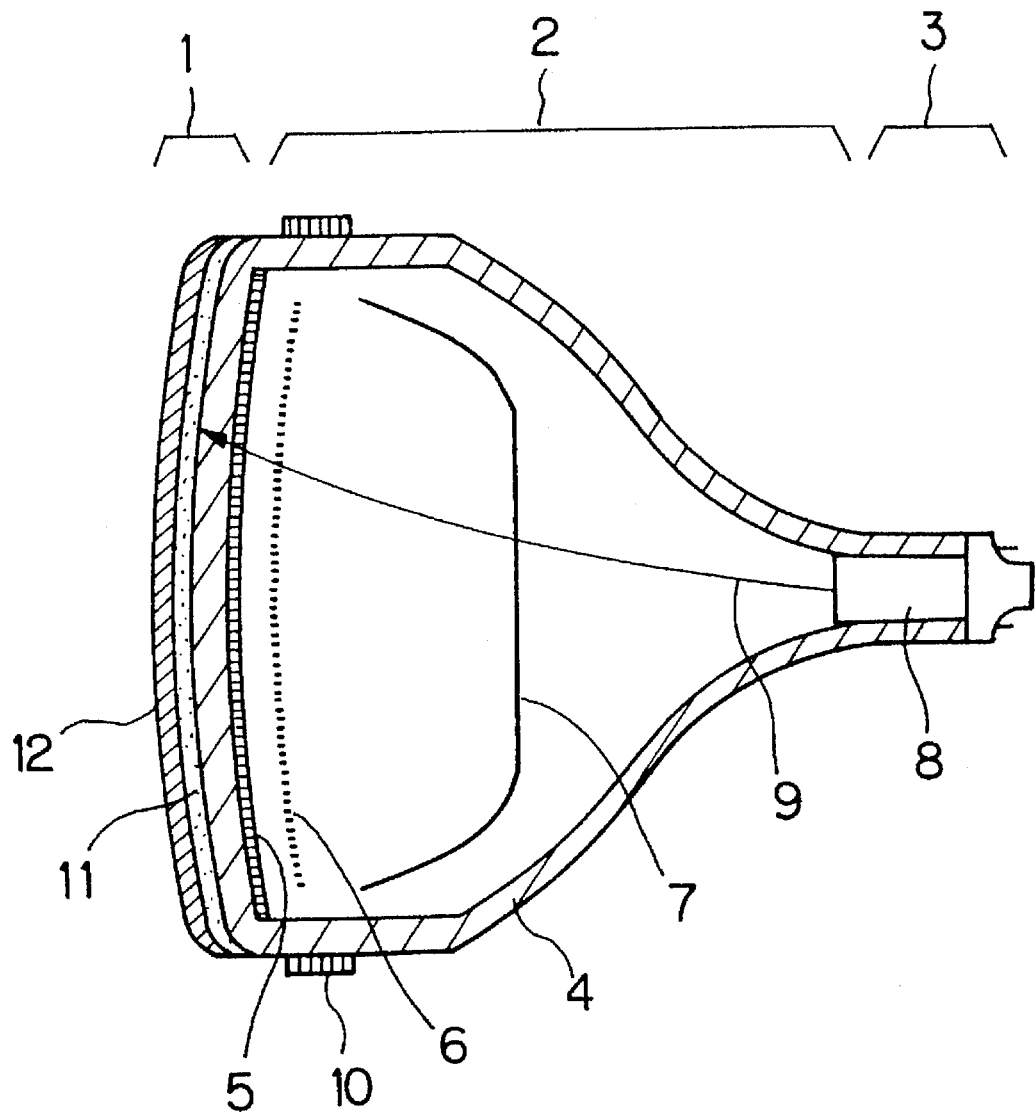
FIG. 1 is a sectional view of a CRT according to a first embodiment of the present invention.

FIG. 1 is a sectional view of a Trinitron color CRT produced by the method of the present invention. This CRT is formed from a glass container having a panel portion 1, a funnel portion 2, and a cylindrical neck portion 3. The outer surface of the panel portion 1 has an arrangement characteristic of the present invention. The rest of the CRT is arranged in the same way as in the conventional Trinitron color CRT.

That is, at the inner surface of the panel portion 1, a panel glass 4 is coated with red, green and blue phosphors 5 in stripes. An aperture grill 6 is disposed to face the phosphors 5, and a magnetic shield 7 is provided behind the aperture grill 6. An electron gun 8 is accommodated in the neck portion 3 so that electron beams 9 emitted from the electron gun 8 pass through a slit of the aperture grill 6 and irradiate a given portion of the phosphors 5 on the inner surface of the panel portion 1, causing the irradiated phosphors 5 to emit light.

The outer peripheral portion of the panel portion 1 is provided with a shrunk band 10 by a conventional method for the purpose of preventing explosion of the CRT. Thus, the CRT of the present invention may jointly use the conventional explosion proof technique.

At the outer surface of the panel portion 1, an ultraviolet-curing resin layer 11 and a light-transmitting film 12 are layered in the mentioned order on the panel glass 4. The panel glass 4 has been subjected to rough S/E polishing after pressing, but it has not been subjected to external polishing and S/E polishing, which is usually carried out later. Therefore, irregularities of the order of about 30 um remain on the surface of the panel glass 4.

Layered the light-transmitting film 12 on the panel glass 4 of the CRT may be carried out according to the process shown in FIGS. 2A to 2E.

Figure 2A:
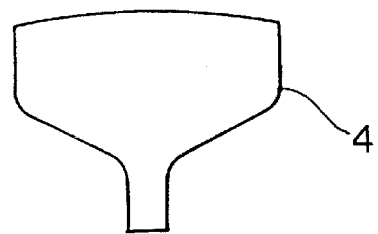
FIGS. 2A, 2B, 2C, 2D and 2E show a process of stacking a light-transmitting film on a panel glass of a CRT according to a second embodiment of the present invention.

First, as shown in FIG. 2A, a panel glass 4 which has been produced by pressing and subjected to no external polishing is prepared. With the panel glass 4, a CRT improved in the explosion-proof performance with a shrunk band is produced by the conventional method. The surface of the panel portion of the CRT thus obtained is successively cleaned with a detergent, pure water, and an alcoholic solvent and then dried.

Figure 2B:
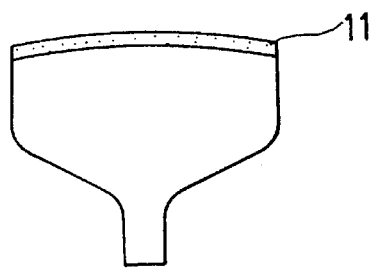

Next, as shown in FIG. 2B, the glass panel 4 is coated with an ultraviolet-curing resin composition 11*a*. The ultraviolet-curing resin composition 11*a* has been prepared so that the difference between the refractive index of a layer formed by curing the composition 11*a* and that of the panel glass 4 falls within 0.8%.

The ultraviolet-curing resin composition 11*a* may contain a photopolymerizable oligomer, e.g., an epoxy acrylate, a urethane acrylate, a polyester acrylate, a polyether acrylate, a silicone acrylate, and so forth, a photopolymerizable monomer, e.g., a monofunctional acrylate, a polyfunctional acrylate, etc., a photopolymerization initiator, e.g., benzoin, acetophenone, peroxide, thioxane, etc., a sensitizer, e.g., an amine, a quinone, etc., a thermal polymerization inhibitor, a filler, an adhesion imparting agent, a thixotropic agent, and so forth. From the viewpoint of weatherability and bond strength, it is particularly preferable to use a composition containing a urethane acrylate as a photopolymerizable oligomer, a monofunctional acrylate as a photopolymerizable monomer, and a benzoin initiator as a photopolymerization initiator.

Such a photopolymerizable oligomer, photopolymerizable monomer and photopolymerization initiator are preferably mixed in the following proportions: 60 to 150 parts by weight of a photopolymerizable monomer to 100 parts by weight of a photopolymerizable oligomer, and 0.05 to 2.0 parts by weight of a photopolymerization initiator to 100 parts by weight of the mixture of photopolymerizable oligomer and photopolymerizable monomer.

Further, the viscosity of the ultraviolet-curing resin composition is preferably in the range of from 300 cps to 3,000 cps.

The ultraviolet-curing resin composition is used after the refractive index thereof has been adjusted so that it differs from the refractive index of the glass panel 4 by not more than 0.8%. The adjustment of the refractive index may be effected, for example, by replacing a part of the ultraviolet-curing resin composition with a photopolymerizable oligomer and a photopolymerizable monomer which have an increased number of aromatic rings, thereby increasing the refractive index, or by mixing a proper amount of styrene monomer with the ultraviolet-curing resin composition. As an example, Table 1 shows the refractive indices of liquid compositions prepared by mixing the ultraviolet-curing resin composition and styrene monomer in various ratios, and the refractive indices of the cured compositions.

TABLE 1

| Ratio (ultraviolet-curing resin/ styrene monomer) | Refractive index (liquid composition) | Refractive index (cured composition) |
| --- | --- | --- |
| 100/0 | 1.4995 | 1.5140 |
| 100/10 | 1.5049 | 1.5240 |
| 100/20 | 1.5088 | 1.5306 |
| 100/30 | 1.5120 | 1.5261 |
| 100/50 | 1.5150 | 1.5445 |
| 100/75 | 1.5193 | 1.5483 |
| 100/100 | 1.5226 | 1.5540 |

As will be understood from Table 1, as the proportion of the styrene monomer increases, the refractive index of the resulting composition becomes higher. However, as the proportion of the styrene monomer increases, the curing speed lowers. Therefore, it is preferable to add a sensitizer accordingly. The ultraviolet-curing resin composition having its refractive index adjusted as described above is coated on the panel glass 4 after air bubbles contained therein have been removed. The coating process may be carried out by a known method, e.g., flow-coating, roll coating, bar coating, and so forth.

Figure 2C:
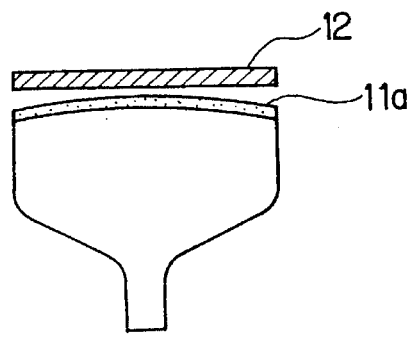

After the ultraviolet-curing resin composition 11a has been coated on the panel glass 4, the surface of the coated composition 11a is covered with a light-transmitting film 12 cut in conformity to the outer shape of the panel glass 4, as shown in FIG. 2C. The provision of the light-transmitting film 12 enables an improvement in the resistance to scratching in comparison to a case where the outermost surface of the CRT is formed from the ultraviolet-curing resin composition 11a.

Examples of materials usable as the light-transmitting film 12 include an acrylic resin, an acryl styrene resin, a polycarbonate resin, a polyvinyl chloride resin, a polyester resin, a styrene resin, a urethane resin, and a polyethylene resin. In general, the thickness of such a resin film is preferably in the range of from 0.05 mm to 2.0 mm.

It is also possible to use a stack of a plurality of different kinds of resin film as the light-transmitting film 12. The light-transmitting film 12 may be subjected at one side thereof to primer treatment for enhancing the adhesion to the ultraviolet-curing resin composition 11a and at the other side thereof to hard coat treatment for ensuring the required surface hardness and also to antistatic treatment, anti-reflection treatment, etc.

Figure 2D:
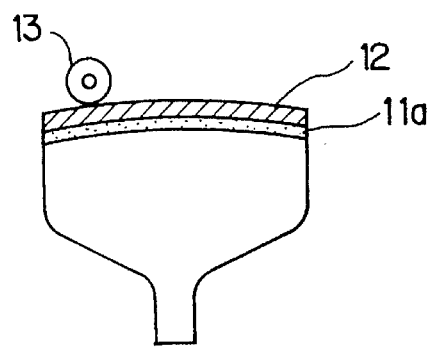

After the light-transmitting film 12 has been placed on the panel glass 4, the film 12 is press rolled by using a press roll 13, as shown in FIG. 2D, to make uniform the thickness of the ultraviolet-curing resin composition 11a lying between the panel glass 4 and the light-transmitting film 12 so that no lines or wrinkles are developed on the surface. As the press roll 13, a metal roll, a rigid rubber roll, a rubber-lined metal roll, etc. may be used. It is preferable to adjust the thickness of the ultraviolet-curing resin composition 11a in the range of from 0.05 mm to 2.5 mm by using such a roll.

Figure 2E:
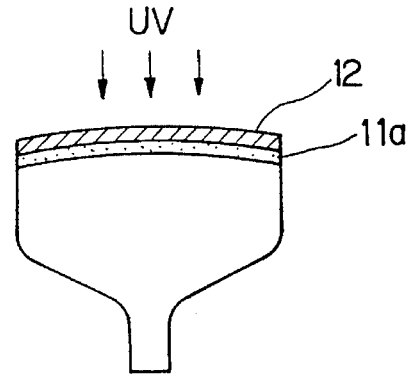

Next, as shown in FIG. 2E, ultraviolet radiation UV is applied from the outside of the light-transmitting film 12 to cure the ultraviolet-curing resin composition 11a. As an ultraviolet light source, a metallic halide lamp, a high-pressure mercury lamp, a xenon lamp, and so forth may be used. A proper dose is 400 to 500 mJ/cm$^2$.

With the above-described CRT producing method, the weight of a 29-inch color CRT can be reduced by about 8.2% in comparison to CRTs produced by the PPG laminating method.

Although one embodiment of the present invention has been described above, it should be noted that the present invention is not necessarily limited to the above-described method, and that the CRT of the present invention may be produced in various other modes.

Figure 3A:
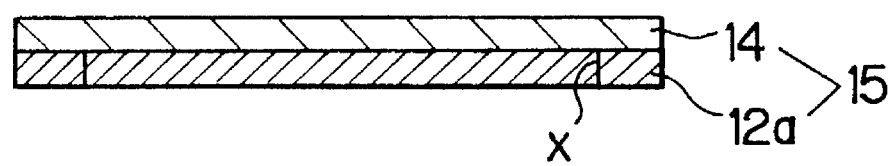
FIGS. 3A and 3B illustrate a laminate sheet composed of a light-transmitting film and a protective sheet.
Figure 3B:
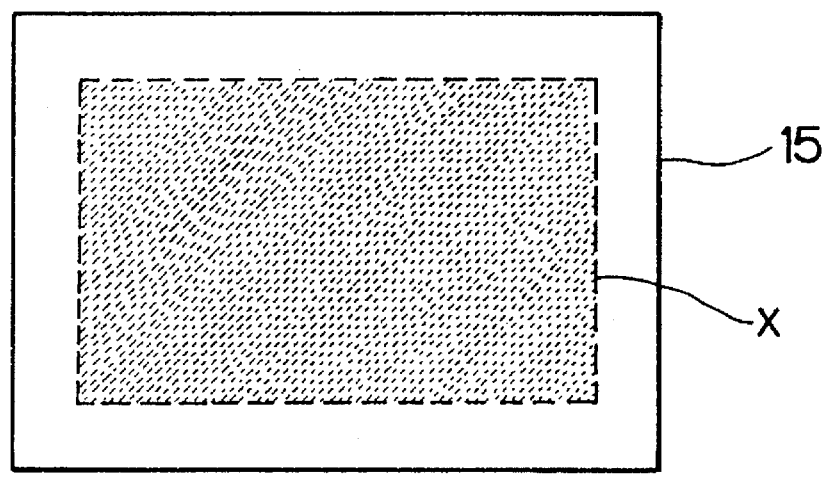

For example, the light-transmitting film 12 may be laminated on the panel glass 4 of the CRT as follows: As shown in FIGS. 3A and 3B, which are a sectional view and a top plan view, respectively, a laminate sheet 15 that is composed of a light-transmitting film 12a and a protective sheet 14 is prepared. The light-transmitting film 12a has an area which is 1.1 to 1.5 times the area of the panel glass 4 (the hatched portion in FIG. 3B), and it also has a formed therein in conformity to the outer shape of the panel glass 4. In this case, as the protective sheet 14, for example, a PET film having a thickness of about 200 um may be used.

Figure 4A:
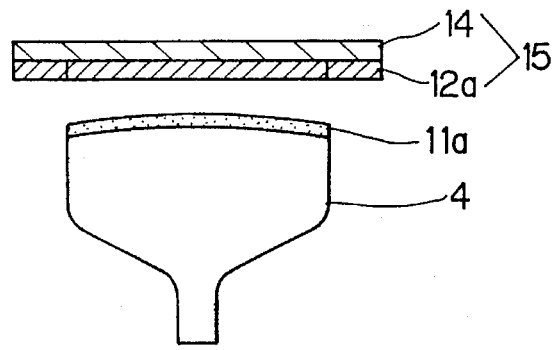
FIGS. 4A, 4B, 4C and 4D show a process of applying a light-transmitting film on a panel glass of a CRT according to a third embodiment of the present invention.
Figure 4B:
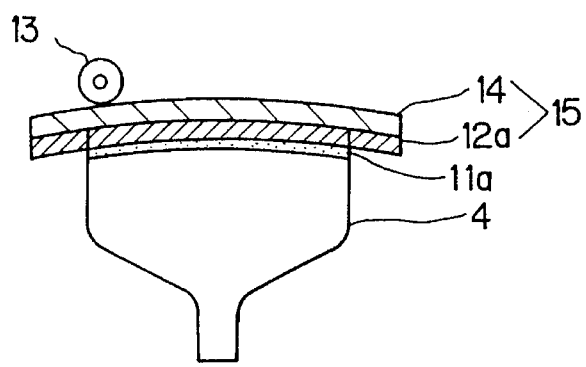

As shown in FIG. 4A, the laminate sheet 15 is attached to the surface of the panel glass 4 coated with the ultraviolet-curing resin composition 11a, with the protective sheet 14 facing upward, and squeegeed by using a press roll 13 (see FIG. 4B). By using a light-transmitting film cut to a size larger than the panel glass 4 as described above, it is possible to prevent the press roll 13 from becoming contaminated by the ultraviolet-curing resin composition 11a even if it squeezes out from the surface of the panel glass 4 during the press rolling process.

Figure 4C:
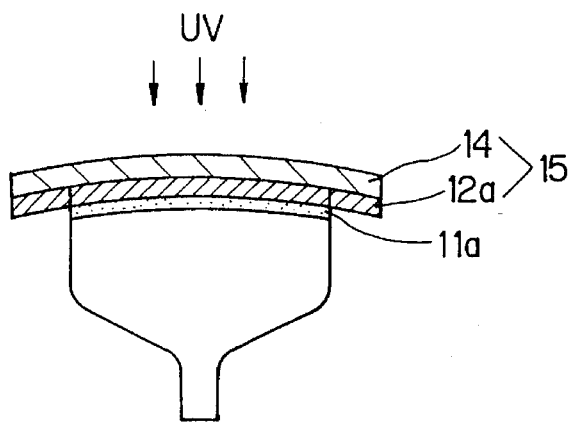
Figure 4D:
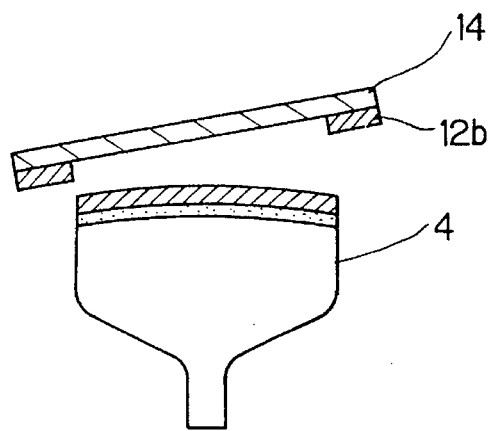

Next, ultraviolet radiation is applied to the laminate sheet 15 from the protective sheet side to cure the ultraviolet-curing resin composition 11a (see FIG. 4C). Then, the protective sheet 14, together with the unnecessary outer peripheral portion 12b of the light-transmitting film 12a, is pulled off from the panel glass 4 (see FIG. 4D). At this time, the unnecessary outer peripheral portion 12b alone can be readily pulled off because the light-transmitting film 12a has the cut x previously made therein.

Thus, the press roll 13 for press rolling can be prevented from contamination when the light-transmitting film is applied by using the laminate sheet 15 composed of the light-transmitting film 12a and the protective sheet 14. Further, since the light-transmitting film 12a is protected by the protective sheet 14 during the laminating process, the handleability of the light-transmitting film 12a can be improved.

In this case, it is preferable to previously print-coat an ultraviolet-absorbing paint or the like on the outer peripheral portion 12b of the light-transmitting film 12a or on the portion of the protective sheet 14 that corresponds to the outer peripheral portion 12b so that no ultraviolet radiation passes through the outer peripheral portion 12b when the ultraviolet radiation is applied to the laminate sheet 15 to cure the ultraviolet-curing resin composition 11a (FIG. 4C). By doing so, the outer peripheral portion 12b can be peeled off (FIG. 4D) even more easily after the ultraviolet irradiation.

With regard to the laminate sheet 15 composed of the light-transmitting film 12a and the protective sheet 14, the protective sheet 14 may be formed in a roll of belt-shaped sheet so that it can be continuously used. By doing so, the protective sheet 14 can be recycled, and the productivity can also be improved.

Figure 5A:
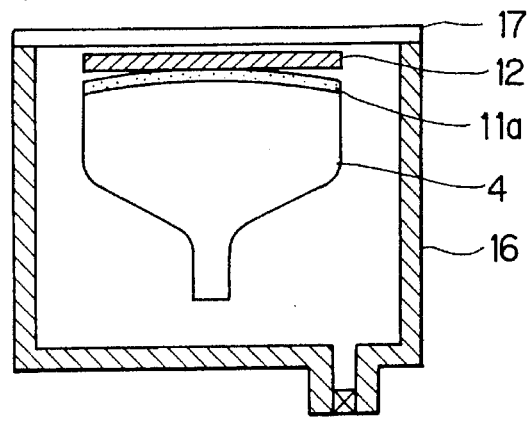
FIGS. 5A, 5B and 5C show a process of applying a light-transmitting film on a panel glass of a CRT according to a fourth embodiment of the present invention.
Figure 5B:
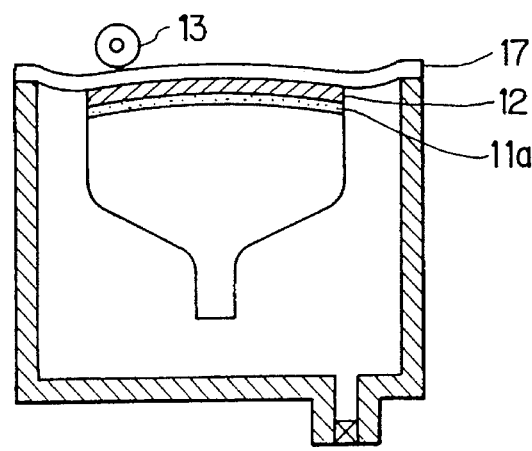
Figure 5C:
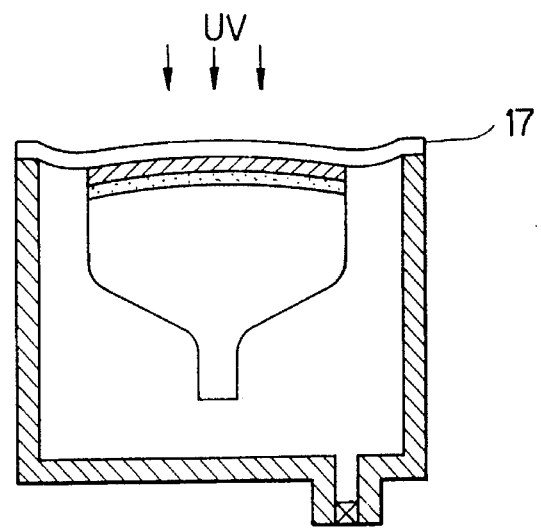

The production method of the present invention may be modified as follows: In the process of layering the light-transmitting film 12 on the panel glass 4 as shown in FIGS. 2C to 2E, the step of press rolling the light-transmitting film 12 provided on the panel glass 4 with the press roll 13 (FIG. 2D) and the step of applying ultraviolet radiation (FIG. 2E) may be replaced by the following steps: As shown in FIGS. 5A to 5C, a vacuum container or chamber 16 one side of which is made of a transparent rubber sheet 17, which transmits ultraviolet radiation, is used, and the panel glass 4 provided with the light-transmitting film 12 through the ultraviolet-curing resin composition 11a is accommodated in the vacuum container 16 (see FIG. 5A). Then, while the vacuum container 16 is being evacuated to about $10^{-1}$ torr, the light-transmitting film 12 is press rolling with the press roll 13 through the transparent rubber sheet 17 (see FIG. 5B), thereby completely removing air bubbles from the ultraviolet-curing resin composition 11a. Thereafter, ultraviolet radiation UV is applied through the transparent rubber sheet 17 (see FIG. 5C).

By carrying out squeegeeing and ultraviolet irradiation using the vacuum container 16 as shown in FIG. 5A to 5C, the ultraviolet-curing resin composition 11a can be effectively cured even when it is anaerobic, and air bubbles contained in the ultraviolet-curing resin composition 11a can be completely removed. In addition, since the pressure is uniformly applied to the light-transmitting film 12 and the ultraviolet-curing resin composition 11a is cured by irradiation with ultraviolet radiation in the state of being pressed, the smoothness of the surface of the light-transmitting film 12 can be improved to a considerable extent.

According to the present invention, it is possible to achieve a reduction in the weight of the CRT and an improvement in the explosion-proof performance, which have been demanded with the realization of large-sized CRTs and flat-panel CRTs, and it is also possible to produce such CRTs by a simplified process and at a reduced cost.

What is claimed is:

1. A method of producing cathode-ray tube apparatus which includes a panel glass surface treating process, said panel glass surface treating process comprising the steps of:

coating a surface of a panel glass which has been subjected to no external polishing with an ultraviolet-curing resin composition which gives a cured material having a refractive index which differs from a refractive index of said panel glass by not more than 0.8%;

providing a light-transmitting film on said ultraviolet-curing resin composition;

roll pressing the light-transmitting film so as to unify the thickness of the ultraviolet-curing resin composition between the panel glass and light-transmitting film; and curing said ultraviolet-curing resin composition by irradiation with ultraviolet radiation, thereby integrating said panel glass, ultraviolet-curing resin composition and light-transmitting film into one unit.

2. A method of producing a cathode-ray tube apparatus which includes a panel glass surface treating process, said panel glass surface treating process comprising the steps of:

coating a surface of a panel glass which has been subjected to no external polishing with an ultraviolet-curing resin composition which gives a cured material having a refractive index which differs from a refractive index of said panel glass by not more than 0.8%;

providing a light-transmitting film on said ultraviolet-curing resin composition; and curing said ultraviolet-curing resin composition by irradiation with ultraviolet radiation, thereby integrating said panel glass, ultraviolet-curing resin composition and light-transmitting film into one unit; said method further including a previous step of attaching a light-transmitting film which is larger in area than said panel glass and has a cut in the same shape as an outer shape of said panel glass to a protective sheet, and providing the light-transmitting film on the ultraviolet-curing resin composition coated on said panel glass; and after the ultraviolet-curing resin composition has been cured by irradiation with ultraviolet radiation, peeling off an outer peripheral portion of the light-transmitting film that extends beyond outer edges of said panel glass together with said protective sheet.

3. The method of claim 3, further including the steps of:

disposing said panel glass and the light-transmitting film in a vacuum container which has at least one side made of an ultraviolet radiation transparent rubber sheet, evacuating said vacuum container roll pressing said light-transmitting film by applying a force to an external surface of said transparent rubber sheet, and curing said ultraviolet-curing resin composition by transmitting ultraviolet radiation through said transparent rubber sheet.

4. A method of producing a cathode-ray tube apparatus which includes a panel glass surface treating process, said panel glass surface treating process comprising the steps of:

coating a surface of a panel glass which has been subjected to no external polishing with an ultraviolet-curing resin composition which gives a cured material having a refractive index which differs from a refractive index of said panel glass by not more than 0.8%;

providing a light-transmitting film on said ultraviolet-curing resin composition;

roll pressing the light-transmitting film so as to unify the thickness of the ultraviolet-curing resin composition between the panel glass and light-transmitting film; and curing said ultraviolet-curing resin composition by irradiation with ultraviolet radiation, thereby integrating said panel glass, ultraviolet-curing resin composition and light-transmitting film into one unit.

5. A method of treating a panel glass of a cathode-ray tube comprising the steps of:

coating an external surface of a panel glass which is free of external polishing with an ultraviolet-curing resin composition;

disposing a light-transmitting film over said ultraviolet-curing resin composition;

press rolling the light-transmitting film so as to unify the thickness of the ultraviolet-curing resin composition between the panel glass and light-transmitting film; and curing said ultraviolet-curing resin by transmitting ultraviolet radiation through said light-transmitting film.

* * * * *